US009934283B2

(12) United States Patent
Fredinburg et al.

(10) Patent No.: US 9,934,283 B2
(45) Date of Patent: Apr. 3, 2018

(54) SOCIAL ANNOTATIONS FOR ENHANCED SEARCH RESULTS (71) Applicant: Google LLC, Mountain View, CA (US)

(72) Inventors: Dan Fredinburg, San Francisco, CA (US); Andrew Swerdlow, San Francisco, CA (US)

(73) Assignee: Google LLC, Mountain View, CA (US)

(*) Notice: Subject to any disclaimer, the term of this patent is extended or adjusted under 35 U.S.C. 154(b) by 427 days.

(21) Appl. No.: 13/791,020

(22) Filed: Mar. 8, 2013

(65) Prior Publication Data

US 2014/0258276 A1 Sep. 11, 2014

(51) Int. Cl.
*G06F 7/00* (2006.01)
*G06F 17/30* (2006.01)

(52) U.S. Cl.
CPC .... *G06F 17/3053* (2013.01); *G06F 17/30867* (2013.01)

(58) Field of Classification Search
CPC ......... G06F 17/30867; G06F 17/30864; G06F 17/30554; G06F 17/3053; G06F 17/30648
See application file for complete search history.

(56) References Cited

U.S. PATENT DOCUMENTS

| | | | | |
|---|---|---|---|---|
| 5,418,951 A | * | 5/1995 | Damashek | G06F 17/275 |
| 8,429,173 B1 | * | 4/2013 | Rosenberg | G06F 17/30247 |
| | | | | 707/748 |
| 8,676,797 B2 | * | 3/2014 | Rohrs | G06F 17/30867 |
| | | | | 707/732 |
| 2008/0005073 A1 | * | 1/2008 | Meek | G06F 17/30867 |
| 2008/0059455 A1 | * | 3/2008 | Canoy et al. | 707/5 |
| 2008/0275846 A1 | * | 11/2008 | Almas | 707/3 |
| 2009/0063455 A1 | * | 3/2009 | Li | G06F 17/30265 |
| 2009/0144264 A1 | | 6/2009 | Singh et al. | |
| 2009/0248516 A1 | * | 10/2009 | Gross | G06F 17/30899 |
| | | | | 705/14.66 |
| 2009/0271247 A1 | * | 10/2009 | Karelin et al. | 705/10 |
| 2009/0271374 A1 | | 10/2009 | Korn et al. | |
| 2010/0057716 A1 | * | 3/2010 | Stefik | G06F 17/3071 |
| | | | | 707/E17.108 |

(Continued)

OTHER PUBLICATIONS

Newman, "Bing's Social Search: A Hands-On Tour," PCWorld, May 16, 2012, pp. 1-3, www.pcworld.com. Retrieved from the Internet: URL:http://www.pcworld.com/article/255669/bings_social_search_a_hands_on_tour.html [retrieved on Apr. 14, 2014].

(Continued)

*Primary Examiner* — Hasanul Mobin
(74) *Attorney, Agent, or Firm* — Fish & Richardson P.C.

(57) ABSTRACT

Methods, systems, and apparatus, including computer programs encoded on a computer storage medium, for obtaining search results that are responsive to a received query received from a user, identifying one or more topics associated with the query, determining that social annotations are to be displayed in a search results page based on at least one topic of the one or more topics and data associated with the user, and in response: providing an electronic document including instructions that, when executed by a computing device, cause the computing device to display an enhanced search results page comprising the search results and one or more social annotations, and transmitting the electronic document to a computing device associated with the user.

27 Claims, 6 Drawing Sheets

(56) References Cited

U.S. PATENT DOCUMENTS

| | | | |
|---|---|---|---|
| 2010/0223261 A1* | 9/2010 | Sarkar | G06F 17/30705 707/726 |
| 2011/0078584 A1* | 3/2011 | Winterstein et al. | 715/751 |
| 2011/0258556 A1* | 10/2011 | Kiciman | G06Q 10/10 715/751 |
| 2012/0150955 A1* | 6/2012 | Tseng | 709/204 |
| 2012/0197750 A1* | 8/2012 | Batra | G06F 17/30592 705/26.7 |
| 2013/0036109 A1* | 2/2013 | Kulick | G06Q 10/10 707/722 |
| 2013/0097143 A1* | 4/2013 | Shenoy | G06F 17/30867 707/706 |
| 2013/0097144 A1* | 4/2013 | Siamwalla et al. | 707/706 |
| 2013/0166578 A1* | 6/2013 | Papineni | 707/755 |
| 2014/0207912 A1* | 7/2014 | Thibeault | H04L 65/4084 709/219 |

OTHER PUBLICATIONS

Muralidharan et al., "Social annotations in web search," Proceedings of the 2012 ACM Annual Conference on Human Factors in Computing Systems, CHI '12, Jan. 1, 2012, 10 pages.

International Search Report and Written Opinion in International Application No. PCT/US2014/017041, dated Apr. 25, 2014, 11 pages.

International Preliminary Report on Patentability in International Application No. PCT/US2014/017041, dated Sep. 17, 2015, 7 pages.

* cited by examiner

SOCIAL ANNOTATIONS FOR ENHANCED SEARCH RESULTS

BACKGROUND

The Internet provides access to a wide variety of resources, such as image files, audio files, video files, and web pages. A search system can identify resources in response to queries submitted by users and provide information about the resources in a manner that is useful to the users. The users then navigate through (e.g., click on) the search results to acquire information of interest to the users.

Users of search systems are often searching for information regarding a specific entity. For example, users may want to learn about a singer that they just heard on the radio. Conventionally, the user would initiate a search for the singer and select from a list of search results determined to be relevant to the singer.

SUMMARY

This specification relates to presenting data with search results.

Implementations of the present disclosure are generally directed to providing enhanced search results that include social annotations. In some examples, social annotations are provided based on one or more topics associated with a search query received from a searching user, and one or more topics associated with the searching user.

In general, innovative aspects of the subject matter described in this specification can be embodied in methods that include actions of obtaining search results that are responsive to a received query received from a user, identifying one or more topics associated with the query, determining that social annotations are to be displayed in a search results page based on at least one topic of the one or more topics and data associated with the user, and in response: providing an electronic document including instructions that, when executed by a computing device, cause the computing device to display an enhanced search results page comprising the search results and one or more social annotations, and transmitting the electronic document to a computing device associated with the user. Other implementations of this aspect include corresponding systems, apparatus, and computer programs, configured to perform the actions of the methods, encoded on computer storage devices.

These and other implementations can each optionally include one or more of the following features: determining that social annotations are to be displayed includes determining that the at least one topic is associated with the user; determining that the at least one topic is associated with the user includes: identifying a set of topics associated with the user based on the data associated with the user, and determining that the at least one topic is included in the set of topics associated with the user; the data associated with the user includes an identifier assigned to the user; determining that social annotations are to be displayed in the search results page includes determining that a knowledge panel is to be displayed in the search results page, the knowledge panel being associated with the at least one topic, the knowledge panel being annotated with the at least one social annotation in the enhanced search results page; determining that a knowledge panel is to be displayed includes identifying content for display in the knowledge panel for a factual entity associated with the knowledge panel, the knowledge panel presenting the identified content in a knowledge panel area alongside at least a portion of the search results; at least one social annotation includes at least one of an image, a link to a resource, text, a video, and digital content distributed using one or more computer-implemented services; actions further include retrieving, from a data store, social annotations of the one or more social annotations in response to determining that social annotations are to be displayed in a search results page; and actions further include generating social annotations of the one or more social annotations in response to determining that social annotations are to be displayed in a search results page.

Particular implementations of the subject matter described in this specification can be implemented so as to realize one or more of the following advantages. Implementations enable users to instantly find context-relevant information by leveraging user social graph information in hand with search results, interests, related topics, and popular search results derived from the search results.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
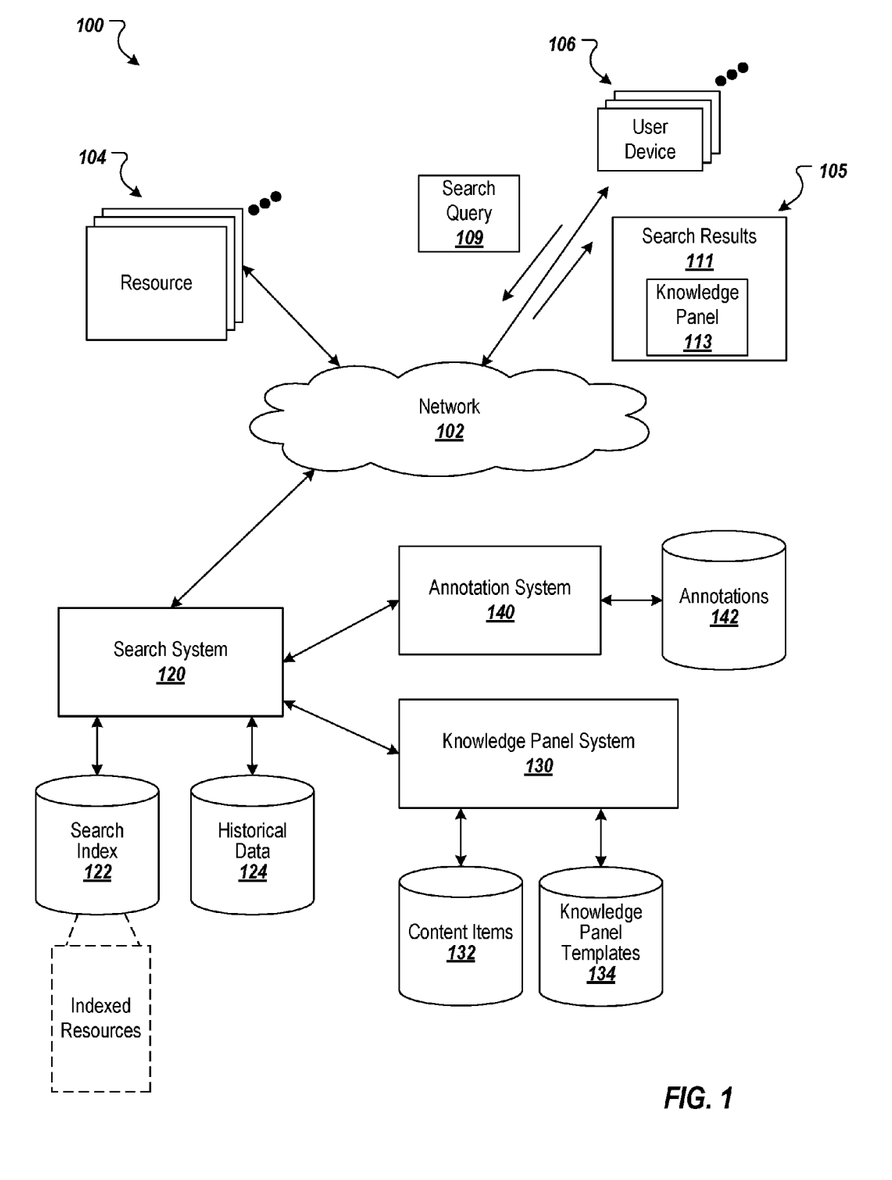
FIG. 1 depicts an example environment in which a search system provides search services.

FIG. 1 is a block diagram of an example environment 100 in which a search system 120 provides search services. The example environment 100 includes a network 102 that connects resources 104, user devices 106, and the search system 120 for communication therebetween. Example resources can include web sites. In some examples, the network 102 includes a local area network (LAN), wide area network (WAN), the Internet, telephone networks, e.g., public switched telephone network (PSTN) and/or cellular network, or any appropriate combination thereof.

In some examples, a user device 106 is an electronic device that is under control of a user and is capable of requesting and receiving resources 104 over the network 102. In some examples, user devices 106 can include a mobile phone, a smartphone, a personal digital assistant (PDA), a laptop computer, a desktop computer, a tablet, and any appropriate combinations thereof. As used throughout this document the term mobile computing device ("mobile device") refers to a user device that is configured to communicate over a mobile communications network. A smartphone, (i.e., a phone that is enabled to communicate over the Internet) is an example of a mobile device. A user device 106 typically includes a user application, e.g., a web browser, to facilitate the sending and receiving of data over the network 102.

In some examples, the network 102 can be accessed over a wired and/or a wireless communications link. In some examples, computing devices, e.g., smartphones, can utilize a cellular network to access the network 102. For example, communication can be provided under various modes or protocols. Example protocols can include SMS, EMS or MMS messaging, GSM, TCP, UDP, RTP, VoIP, FDMA, CDMA, TDMA, PDC, WCDMA, CDMA2000, TD-SCDMA and/or GPRS. Such communication may occur, for example, through a radio-frequency transceiver (not shown). In some examples, user devices 106 can be capable of short-range communication using features including, but not limited to, Bluetooth and/or WiFi transceivers.

In some examples, a web site is provided as one or more resources 104 associated with a domain name and hosted by one or more servers. An example web site is a collection of web pages formatted in hypertext markup language (HTML) that can contain text, images, multimedia content, and programming elements, e.g., scripts. Each web site is maintained by a publisher, e.g., an entity that manages and/or owns the web site.

In some examples, a resource 104 is data provided over the network 102 and that is associated with a resource address, e.g., a uniform resource locator (URL). Resources 104 that can be provided can include HTML pages, word processing documents, and portable document format (PDF) documents, images, video, and feed sources, to name just a few. The resources 104 can include content, e.g., words, phrases, images and sounds and may include embedded information, e.g., meta information and hyperlinks, and/or embedded instructions, e.g., scripts.

In some examples, and to facilitate searching of resources 104, the search system 120 identifies the resources 104 by crawling and indexing the resources 104 provided on web sites, for example. Data about the resources 104 can be indexed based on the resource to which the data corresponds. The indexed and, optionally, cached copies of the resources 104 are stored in a search index 122.

In some examples, the user devices 106 submit search queries 109 to the search system 120. In response, the search system 120 accesses the search index 122 to identify resources 104 that are relevant to, e.g., have at least a minimum specified relevance score for, the search query 109. The search system 120 identifies relevant resources 104, generates search results 111 that identify the resources 104, and returns the search results 111 to the user devices 106. In some examples, a search results page 105 is data generated by the search system 120 that identifies one or more resources 104 that are responsive to a particular search query, and includes respective links to the resources 104. An example search results page 105 can include search results represented as a web page title, a snippet of text or a portion of an image extracted from the web page, and the URL of the web page.

Data for the search queries 109 submitted during user sessions are stored in a data store, such as the historical data store 124. For example, the search system 120 can store received search queries in the historical data store 124.

Selection data specifying actions taken in response to search results provided in response to each search query 109 are also stored in the historical data store 124, for example, by the search system 120. These actions can include whether a search result was selected, e.g., clicked or hovered over with a pointer. The selection data can also include, for each selection of a search result, data identifying the search query 109 for which the search result was provided.

The example environment 100 also includes a knowledge panel system 130 communicably coupled to the search system 120, e.g., directly coupled or coupled over a network such as network 102. The search system 120 can interact with the knowledge panel system 130 to determine whether to provide a knowledge panel 113 within the search results page 105 for a search query 109. If it is determined that a knowledge panel 113 should be provided, the knowledge panel system 130 can generate the knowledge panel 113 and provide the generated knowledge panel 113 to the search system 120, which in turn provides the search results page 105 and the knowledge panel 113 to the user device 106 that submitted the search query 109. In some examples, and as discussed in further detail herein, the knowledge panel 113 can be displayed in-line with search results, e.g., at the top of the search results page, in the middle of the search results page, at the bottom of the search results page, or the knowledge panel 113 can be displayed adjacent to the search results, e.g., on the right-hand-side or the left-hand-side of the search results page.

In some examples, a knowledge panel 113 can be provided for queries that have been determined to reference a particular entity, such as a person, place, country, landmark, animal, historical event, organization, business, sports team, sporting event, movie, song, album, game, work of art, or any other entity. For example, one or more topics can be determined from the submitted search query, and it can be determined that the one or more topics correspond to a topic, for which a knowledge panel is available. In response, the knowledge panel can be triggered for display. In some examples, whether to display a knowledge panel can be determined based on a set of rules.

In general, a knowledge panel 113 for a particular entity can include content related to the particular entity. In some implementations, a knowledge panel 113 includes a set of factual information deemed relevant to the particular entity. For example, a knowledge panel 113 for an actor may include biographical information for the actor, as well as content associated with movies or television shows that the actor has appeared. In some implementations, the knowledge panel 113 includes a summary of information related to the particular entity. For example, a knowledge panel 113 for a nation may include a map of the nation, the flag of the nation, the official language of the nation, and/or other facts and content related to the nation. In some examples, information provided in the knowledge panel can be pulled from one or more resources, e.g., the resources 104, and can be merged to populate the knowledge panel 113.

In some implementations, a knowledge panel 113 is much larger and consumes more area of a search interface than standard search results 111. For example, the knowledge panel 113 may span the length of three or more standard search results 111 to accommodate the content items in the knowledge panel 113 and to draw attention to the knowledge panel 113.

In some implementations, a knowledge panel 113 is displayed in a knowledge panel area. The knowledge panel area may be presented with or alongside to a search results area that presents search results 111. In some implementations, the knowledge panel area consumes a larger area than the area consumed by two or more of the search results presented in the search results area.

In some examples, the knowledge panel system 130 includes or is communicably coupled to one or more data storage units that include a content items store 132 and a knowledge panel templates store 134. The content items store 132 stores content items that can be inserted into a knowledge panel. In general, the content items are discrete units of content and can be in the form of text, images, videos, graphics, audio, tables, or other types of content.

In some implementations, the content items store 132 includes an index of entities and data identifying content items relevant to the entities. For example, the index may include data identifying a title for an entity, one or more images relevant to the entity, a description of the entity, one or more facts about the entity, one or more videos relevant to the entity, upcoming events related to the entity, content from a social networking page associated with the entity, and other information or types or categories of content that have been deemed relevant to the entity.

The content items for each entity can come from disparate sources and/or disparate publishers. For example, content items for a particular entity can be obtained from several different web pages or other resources that are each hosted by different publishers. To illustrate, the content items for a particular actor may include images of the actor received from several different sources and these images can be included in the same knowledge panel that is provided in response to a query that references the particular actor. As another example, an image of a person may be obtained from an official site for the person, and a set of facts and/or description for the person may be obtained from an online encyclopedia.

In some implementations, the knowledge panel system 130 identifies content items for each of a set of entities by crawling the Internet for content related to the entity. The knowledge panel system 130 can also determine which of the obtained content items to provide with a knowledge panel 113 for the entity. For example, some of the content items may be more relevant to the entity or more appropriate for the knowledge panel 113 than other content items. As an example, an image of a person's face may be more appropriate for a knowledge panel 113 than an image of the person taken from a long distance.

The type or categories of content provided in a knowledge panel 113 may be determined based on the particular entity or the type of entity referenced by the knowledge panel 113. For example, a knowledge panel 113 for a person may include an image of the person, facts about the person, and references to any public works produced by the person. By way of another example, a knowledge panel 113 for a landmark may include images of the landmark, facts about the landmark, and travel information, such as a map, for a person to travel to the landmark. The categories of content that are included in a knowledge panel 113 can also vary based on the particular entity. For example, a person that has acted in movies and that has also recorded one or more albums may include references to both types of works. A knowledge panel template may specify the content for a knowledge panel 113, as described in more detail below.

Although different types of content can be provided for different types of entities and/or different entities within an entity type, the knowledge panels 113 can be configured to provide a recognizable and consistent user interface for users. In some implementations, each knowledge panel 113 can have one or more standard types of content items. For example, the standard types of content items can include a title, an image, a description, and one or more facts about the entity for which the knowledge panel 113 is provided.

In some implementations, the title for a knowledge panel 113 is the name of the entity or an alias of the entity. For example, the title for a knowledge panel 113 provided for a person can be the name of the person. Similarly, the title for a knowledge panel 113 provided for a country can be the name of the country. As the name of the entity may be different from the search query 109 for which the knowledge panel 113 is provided, the title may also be different than the search query 109. For example, a search query 109 may reference an alias or a shortened version of a celebrity's name, while the title for the knowledge panel 113 may include the celebrity's full legal name. In this way, the title provides confirmation of what the knowledge panel 113 references.

The description for the knowledge panel 113 can provide an adequate explanation of what the entity is, such as a summary of the entity, without going into so much detail to distract from the search interface (or other page) in which the knowledge panel 113 is presented. Candidate descriptions can be obtained from a variety of places, such as prefixes of text from trusted encyclopedia articles or top ranking web pages.

The image for a knowledge panel 113 can be an image representative of the entity for which the knowledge panel 113 is generated. This image may vary based on the type of entity and the entity itself. For example, an image for a country may include a map of the country, while an image for a person may include a representative image of the person.

The image for a knowledge panel 113 may be selected by taking a top ranking image from search results for the entity of the knowledge panel 113. For example, a web search directed to images can be performed for an entity and the top ranking image may be selected for the search results for inclusion in knowledge panels 113 for the entity.

The set of facts that are presented in a knowledge panel 113 may be determined based on the type of entity and/or the entity itself. For example, certain facts may be preferred for actors, and a different set of facts may be preferred for singers. Also, certain facts may be relevant to certain entities within an entity type, while not being relevant to other entities within the entity type. For example, a knowledge panel 113 for an actor that has won many awards may include a listing of the awards in the set of facts. However, a listing of awards may be omitted for an actor that has not yet won any awards.

The set of facts that are presented for a particular entity may be based on previously received search queries 109 that referenced the particular entity. For example, if a significant number, e.g., at least a threshold number, of previously received search queries 109 have referenced a person's height, then the person's height may be included in the set of facts that are presented in a knowledge panel for that person. In general, the facts for an entity can be ranked based on the number of the previously received search queries that have been deemed to be requesting information about the entity and that have been deemed to be requesting information about that fact.

Each of the standard types of content items, e.g., title, image, description, and set of facts, can consistently be located in a same portion of the knowledge panel 113 to provide a consistent user interface across knowledge panels 113 for different types of entities. For example, an image may be located near the top left corner of the knowledge panel 113 and the description and facts may be located to the right of the image. If a content item for one of the types of content items is not available for an entity, then that type of content item may be replaced with another type of content item. For example, if an entity does not have an available image, one or more facts may be presented in the knowledge panel in place of an image. Note that the standard types of content items referenced throughout this document are provided above for purpose of example, and that other types of content items can be selected as standard content items.

The knowledge panel templates store 134 stores knowledge panel templates that can be populated with content items to generate a knowledge panel 113. In general, a knowledge panel template specifies types of content items to include in the knowledge panel 113 and includes placeholders for content items of the specified type. For example, a knowledge panel template may include placeholders for a title, one or more images, a description, a set of facts, and/or other types of content items.

The knowledge panel templates store 134 can include one or more templates for each of a set of entity types. For example, the knowledge panel templates store 134 may include one or more "person" templates, "place" templates, "landmark" templates, "movie" templates, "business" templates, "game" templates, "sports team" templates, "sports event" templates, and/or "disambiguation" templates. A knowledge panel template for a particular type of entity may have placeholders for different content item types than a knowledge panel template for another type of entity. For example, a knowledge panel template for a country may include a placeholder for a set of images of cities in the country, while a knowledge panel template for a landmark may include a placeholder for a set of images of other landmarks. Other types of content particular to a type of entity are described below.

The knowledge panel templates store 134 may also include knowledge panel templates for entity subtypes. For example, under the "person" entity type, there may be an "actor" knowledge panel template, a "singer" knowledge panel template, and/or a "historical figure" knowledge panel template. A knowledge panel template for actors may include a placeholder for a set of images of movie or television show posters for movies or television shows in which the actor performed, while a knowledge panel template for singers may include a placeholder for a table element having information regarding songs released by the singer.

In accordance with implementations of the present disclosure, the example environment 100 also includes an annotation system 140 communicably coupled to the search system 120 and an annotations store 142, e.g., directly coupled or coupled over a network such as network 102. The search system 120 can interact with the annotation system 140 to determine whether to provide annotations for annotating one or more search results and/or a knowledge panel 113 within the search results page 105. In some implementations, it can be determined whether search results and/or a knowledge panel are to be annotated based on one or more topics associated with the searching user, e.g., the user that submitted the search query 109, and a topic underlying the knowledge panel 113 that is to be displayed.

In some implementations, the annotations include social annotations that are determined based on the one or more topics and data, e.g., social data, provided from one or more data sources. In some examples, the data is provided from the one or more data sources based on a social graph of a user. In some examples, a social graph can refer to a single social graph or multiple interconnected social graphs. Distinct social graphs can be generated for different types of connections a user has. For example, a user can be connected with chat contacts in one social graph, email contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can then be used to identify additional connections based on that person's connections. The distinct social graphs can include edges connecting one or more social graph to one or more other social graphs. Types of connections and social graphs can include other users in which the user is in direct contact, e.g., user mail or chat contact, direct contacts on social sites and users in which the user is in indirect contact, e.g., friends of friends, connections of users that have a direct connection to the user. In some implementations, the social graph includes content generated by individuals, e.g., blog posts, reviews, as connections to the user. The social graph can include connections within a single network or across multiple networks (separable or integrated). Public social graph relationships can also be considered. In some examples, public relationships can be established through public profiles and/or public social networking services.

As one example, when a user searches for "weather in San Francisco," a knowledge panel can be provided that includes information relevant to weather in San Francisco, as well as annotations indicating contacts, e.g., friends, that are currently in San Francisco. As another example, a knowledge panel can be displayed in response to the search query "movies 94123," and annotations about the movies, e.g., reviews posted by contacts of the searching user, recent check-ins to relevant movie theaters, can be provided with the knowledge panel.

Figure 2:
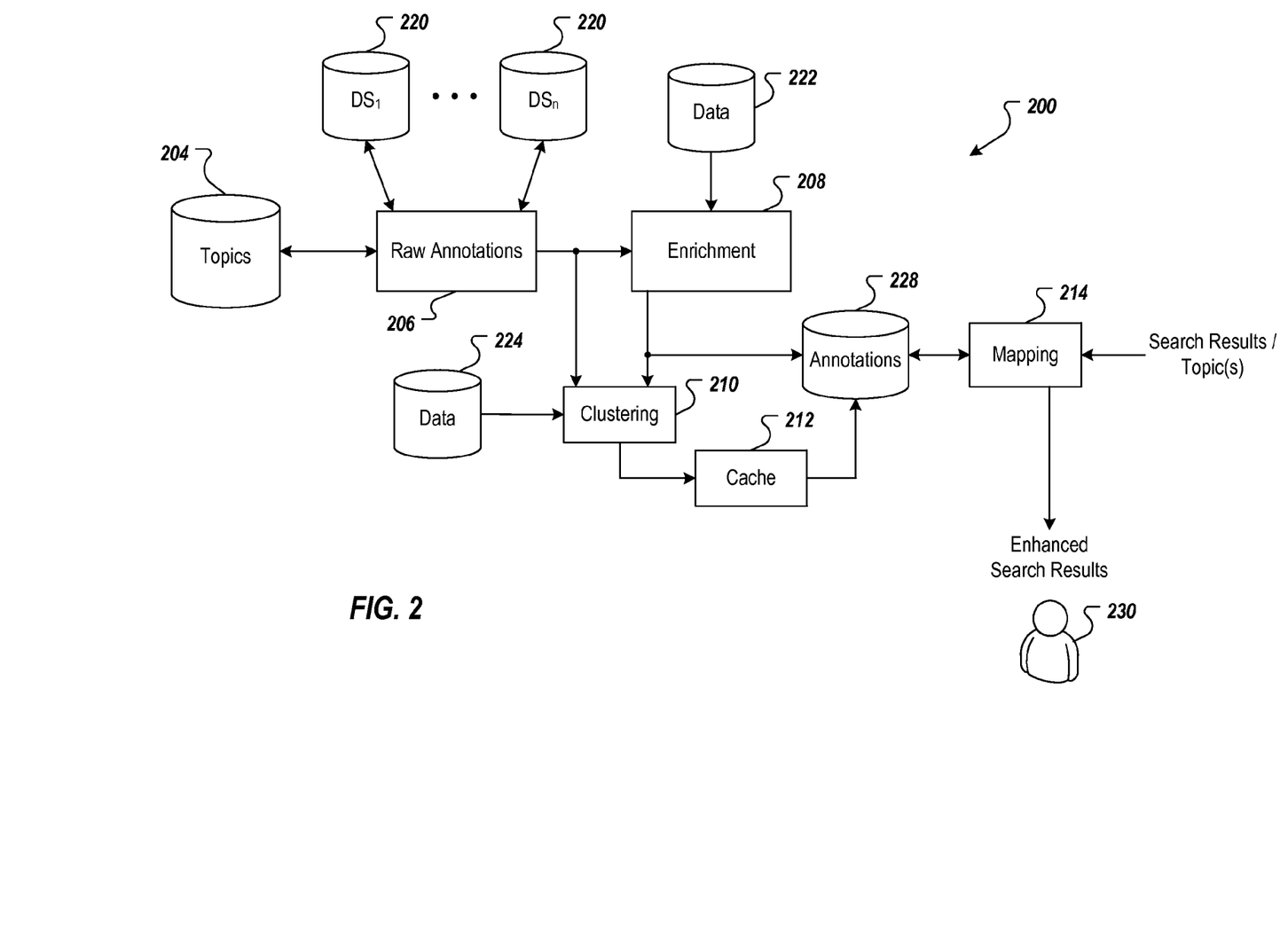
FIG. 2 depicts an example environment to provide enhanced search result pages.

FIG. 2 is a block diagram of an example environment 200 to provide enhanced search results. In some examples, enhanced search results include annotations. In some examples, enhanced search results include a knowledge panel having annotations. In some examples, enhanced search results include search results having annotations. In some examples, components of the example environment 200 can be provided as one or more computer-executable programs that are executed using one or more computing devices, e.g., servers. In some examples, components of the example environment 200 can include computer-readable storage, e.g., databases. In some examples, one or more components of the example environment 200 can be provided in the annotation system 140 and/or the search system 120 of FIG. 1.

In the depicted example, the example environment 200 includes a topics repository 204, e.g., data store, a raw annotations module 206, an enrichment module 208, a clustering module 210, a cache module 212 and a mapping module 214. In the depicted example, the example environment 200 further includes a one or more data sources ($DS_1, \ldots, DS_n$) 220, a first data repository 222, e.g., a data store, and a second data repository 224, e.g., a data store. In some implementations, an annotations repository 228, e.g., data store, can be provided. In some examples, the annotations repository 228 of FIG. 2 includes the annotations store 142 of FIG. 1.

As discussed in further detail herein, the example environment 200 can receive search results, e.g., from the search system 120, and can enhance the search results to include annotations. In this manner, enhanced search results are provided that are to be displayed to a searching user. In accordance with implementations of the present disclosure, whether annotations are to be included to provide the enhanced search results can be based on one or more topics associated with the user and one or more topics associated with the search query. In some implementations, annotations can be specific to the searching user and can include annotations that are explicitly specific and/or implicitly specific to the searching user, as discussed in further detail herein.

The example of FIG. 2, depicts a user 230. In some examples, the user 230 can be a user of one or more computer-implemented services. Example computer-implemented services can include a search service, e.g., provided by the search system 120 of FIG. 1, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In some examples, the user 230 can be associated with one or more topics.

In operation, the user 230 can submit a search query to a search service, e.g., provided by the search system 120 of FIG. 1, and search results responsive to the search query, as well as one or more topics can be provided to the mapping module 214. In some examples, the one or more topics can be provided based on one or more keywords provided in the search query. In some examples, the mapping module can retrieve one or more user-specific annotations, e.g., specific to the user 230, who submitted the search query, from the annotations repository 228 based on an identifier associated with the user 230 and the one or more topics. The mapping module 214 can map the annotations to a search results page to provide an enhanced search results page. For example, the mapping module 214 can annotate a knowledge panel with annotations. As another example, the mapping module 214 can annotate one or more search results with annotations.

In some examples, a set of topics for the user 230 can be provided from the topics repository 204 based on an identifier associated with the user 230. In some examples, the topics repository 204 is provided from a topics service that associates one or more topics with users of one or more computer-implemented services, e.g., the user 230. In some examples, and for a specific user, example topics can include subject matter that the user has explicitly identified as being of interest to the user, e.g., within a profile page of the user, and/or subject matter that is implicitly determined as being of interest to the user, e.g., subject matter that the user has searched for using the search service. Topics can be explicitly and/or implicitly associated with users in a number of manners.

For each user, the set of topics can be provided to the raw annotations module 206. In some examples, the raw annotations module 206 can process the set of topics to identify a set of annotations on a per-topic basis. For example, each topic in the set of topics can be processed to identify one or more annotations, if any, that can be associated with the topic and that is specific to the user, as discussed in further detail herein. In some examples, a topic might not include any annotations associated therewith.

In some examples, a sub-set of topics is processed to identify a set of annotations on a per-topic basis. For example, each topic in the set of topics can include a score associated therewith. In some examples, only topics that are associated with a score that exceeds a threshold score are included in the sub-set of topics. In some examples, the score can include a confidence score that represents a probability, or likelihood, that the respective user will submit a search query that is associated with the particular topic. In this manner, only topics that have a threshold probability of being searched for by the user are included in the sub-set of topics.

In some implementations, for each topic in the set of topics (or sub-set of topics) the raw annotations module 206 queries the one or more data sources 220 to identify annotations relevant to the topic and the respective user. In some examples, data sources of the one or more data sources 220 correspond to computer-implemented services used by the user. In some examples, data sources of the one or more data sources 220 correspond to computer-implemented services used by contacts of the user. For example, the user can use a computer-implemented social networking service and can be a contact of another user within the social networking service, e.g., a friend. In this example, the user is not a user of a ratings/review service, but the other user is a user of the ratings/review service. Consequently, a data source of the one or more data sources 220 can include data associated with the ratings/review service even though the user, for which annotations are being identified, is not a user of the ratings/review service.

In some examples, data sources of the one or more data sources 220 correspond to historical data associated with the user. For example, a data source of the one or more data sources 220 can include historical actions of the user across one or more computer-implemented services.

In some examples, annotations retrieved from the one or more data sources 220 can include data that is relevant to topics of the set of topics (or sub-set of topics). In this manner, for each topic, a set of annotations can be provided. Example annotations can include identification of one or more contacts of the user that are relevant to a topic, identification of one or more posts distributed through a computer-implemented social networking service that are relevant to a topic, one or more ratings/reviews distributed through a ratings/review computer-implemented service that are relevant to a topic, and the like. For example, a contact, e.g., within a computer-implemented service, of the user, for which annotations are being identified, is a resident of Canada, and a topic in the set of topics (or the sub-set of topics) includes Canada. Consequently, an annotation in the set of annotations can include an identifier associated with the contact of the user. As another example, a contact, e.g., within a computer-implemented service, of the user, for which annotations are being identified, checked into a location in Canada, e.g., an airport using a computer-implemented check-in service, and a topic in the set of topics (or the sub-set of topics) includes Canada. Consequently, an annotation in the set of annotations can include an identifier associated with the contact of the user. As another example, a contact, e.g., within a computer-implemented service, of the user, for which annotations are being identified, can frequently post about motorcycles, e.g., within a computer-implemented social networking service, and a topic in the set of topics (or the sub-set of topics) includes motorcycles. Consequently, an annotation in the set of annotations can include an identifier associated with the contact of the user, and/or posts of the contact, which are relevant to motorcycles.

In some implementations, the raw annotations module 206 provides indices of topics and annotations to the enrichment module 208. In some examples, each index is specific to a particular user, e.g., the user 230. In some examples, the enrichment module 208 processes each user-specific index of topics and annotations to identify digital content that provide graphical representations of annotations. In some examples, the enrichment module 208 processes an index of topics and annotations in view of one or more sets of rules. In some examples, a set of rules can include one or more rules that define the type of digital content to be provided as a graphical representation of an annotation. As one example, and continuing with an example above, an annotation in the set of annotations can include an identifier associated with the contact of the user. Consequently, it can be determined that a thumbnail image of the contact, e.g., digital content, is an appropriate graphical representation of the annotation. In this example, a thumbnail image of the contact can be retrieved from a data repository, e.g., one or more of the data sources 220, the first data repository 222.

In some implementations, the enrichment module 208 provides a first set of annotations that can be described as explicit annotations relative to a respective user. In some examples, an explicit annotation can include an annotation that is relevant to a topic and that is provided based on explicit information provided from the one or more data sources, e.g., a contact of the searching user lives in Canada and the topic in question includes Canada. In some implementations, explicit annotations can be provided in response to receipt of a search query. For example, a search query can be received and it can be determined that there is an intersection between one or more topics associated with the user that submitted the query and one or more topics associated with the query. In response to determining that there is an intersection, the above-discussed operations can be triggered to provide annotations from the enrichment module 208. In this manner, the annotations can be provided on-the-fly and can capture dynamic information. For example, and as discussed in further detail herein, an annotation can include a graphical representation of an ongoing video chat session, e.g., a video chat session that is taking place at the time that the search query was received.

In some implementations, explicit annotations can be provided ahead of a search query being submitted. For example, annotations can be determined as discussed above and can be stored, e.g., in the annotations repository 228, for retrieval when a search query is received.

In some implementations, the clustering module 210 can process data received from the raw annotations module 206 and/or the enrichment module 208 to provide a second set of annotations. In some examples, annotations in the second set of annotations can be described as implicit annotations relative to a respective user. In some examples, an implicit annotation can include an annotation that is implicitly relevant to a topic and the respective user. For example, previous searches of the searching user have included searches related to kitchen remodeling, e.g., based on information provided from a historical actions data source 220. Consequently, annotations that are implicitly relevant to a topic, e.g., kitchen remodeling, and the user, e.g., a user that has searched for kitchen remodeling, can include, for example, images of kitchen appliances, hardware, designs, cabinetry, sinks, faucets, and the like, as well as articles that discuss kitchen remodeling.

In some examples, the clustering module 210 generates one or more clusters based on information provided from the raw annotations module 206 and/or the enrichment module 208. In some examples, clustering can be provided based on unsupervised learning that can be used to cluster, e.g., group, various data. In some examples, clusters can be used to identify data content that is implicitly relevant to a topic and the respective user. In some examples, the second set of annotations can be cached in the cache module 212. In some examples, if the annotations repository 228 is provided, the second set of annotations can be stored in the annotations module 228.

In some examples, the mapping module 214 can determine that annotations could be provided to enhance the search results, and can retrieve annotations. In some examples, the mapping module 214 can determine whether one or more topics are associated with the query. In some examples, the query includes one or more terms, and a term can be associated with one or more topics. In some examples, an index of terms and topics can be provided and can be referenced to determine whether one or more topics are associated with the query. In some examples, if it is determined that one or more topics are associated with the query, the mapping module 214 can determine whether one or more annotations are to be provided. In some examples, one or more topics associated with the user that submitted the query can be compared to the one or more topics associated with the query. In some examples, if there is an intersection between the one or more topics associated with the user that submitted the query and the one or more topics associated with the query, it can be determined that annotations are to be provided for topics included in the intersection. In some example, the mapping module 214 can be informed that a knowledge panel is to be displayed with the search results, and annotations can be provided if a knowledge panel is to be displayed, and there is an intersection between the one or more topics associated with the user that submitted the query and the one or more topics associated with the query.

In some examples, the mapping module 214 can retrieve annotations from the annotations repository 228, and can generate an enhanced search results page. In some examples, annotations can be mapped to a knowledge panel and/or search results that are to be provided in an underlying search results page to provide the enhanced search results page. In some examples, annotations can be mapped based on a set of rules. Example rules can define locations of annotations based on a type of annotation and a type of content in the search results page that is to be annotated. For example, a type of annotation can include a thumbnail image of a contact that was selected as an annotation based on a location of the contact, e.g., a contact that lives in Canada, and the type of content in the search results page can include an image, e.g., a map of Canada. Consequently, a rule can provide that the thumbnail image is to overlay the image.

Figure 3:
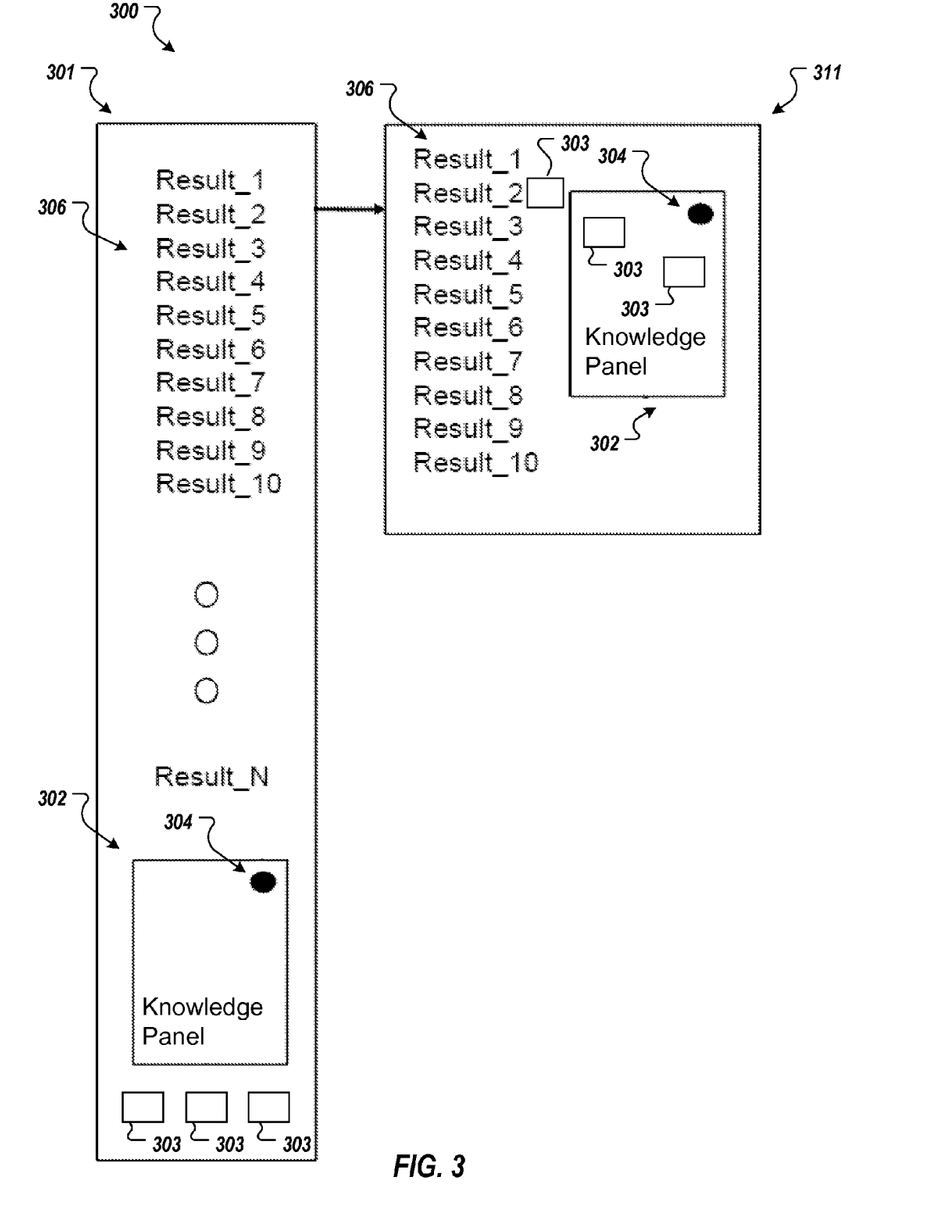
FIG. 3 depicts an example process for providing a search results page including search results and a knowledge panel.

FIG. 3 is a block diagram illustrating a process 300 for providing search results 306 and a knowledge panel 302. In response to receiving a search query, for example a search query that references a particular entity, the search system 120 can identify a set of search results 306 and interact with the knowledge panel system 130 to generate the knowledge panel 302. The search system 120 can also associate the knowledge panel 302 with the set of search results 306. In this example, the set of search results 306 includes Result_1 through Result_N. The content identified and generated by the search system 120 in conjunction with the knowledge panel system 130 is depicted in block 301. It can further be determined that annotations 303 relevant to the knowledge panel and/or the search results, as well as relevant to the searching user are to be displayed to provide enhanced search results.

The example knowledge panel 302 includes a control 304. The control 304 can include a minimization control, an expansion control, and/or a hide control. A minimization control causes the knowledge panel 302 to be minimized when activated. Similarly, an expansion control causes the knowledge panel 302 to expand when activated. The hide control causes the knowledge panel 302 to be hidden when activated. A user may select the control 304 to arrange the knowledge panel 302, for example to facilitate a user optimized search session.

The search system 120 can provide the set of search results 306 or a subset thereof to a user device for presentation in a search interface 311. The search system 120 can also provide the knowledge panel 302 and the annotations 303 to the user device for presentation in the search interface 311. In this example, the knowledge panel 302 is displayed on the right side of the search results 306. In some implementations, the knowledge panel 302 may be displayed to the left of the search results 306, above the search results 306, below the search results 306, or between two of the search results 306.

Figure 4A:
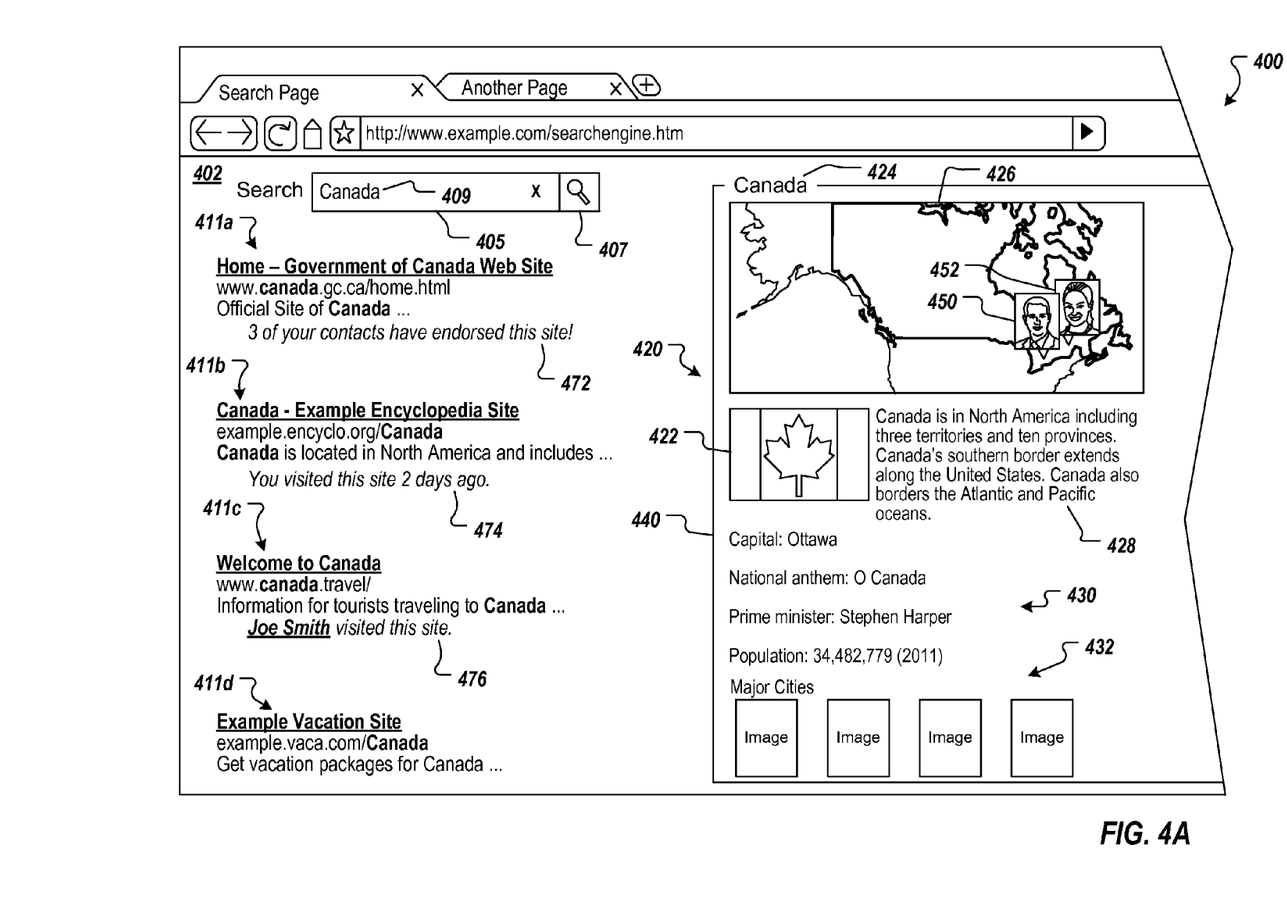
FIGS. 4A and 4B depict a screen shot of an example search interface in which a knowledge panel is presented with search results in a search results page.
Figure 4B:
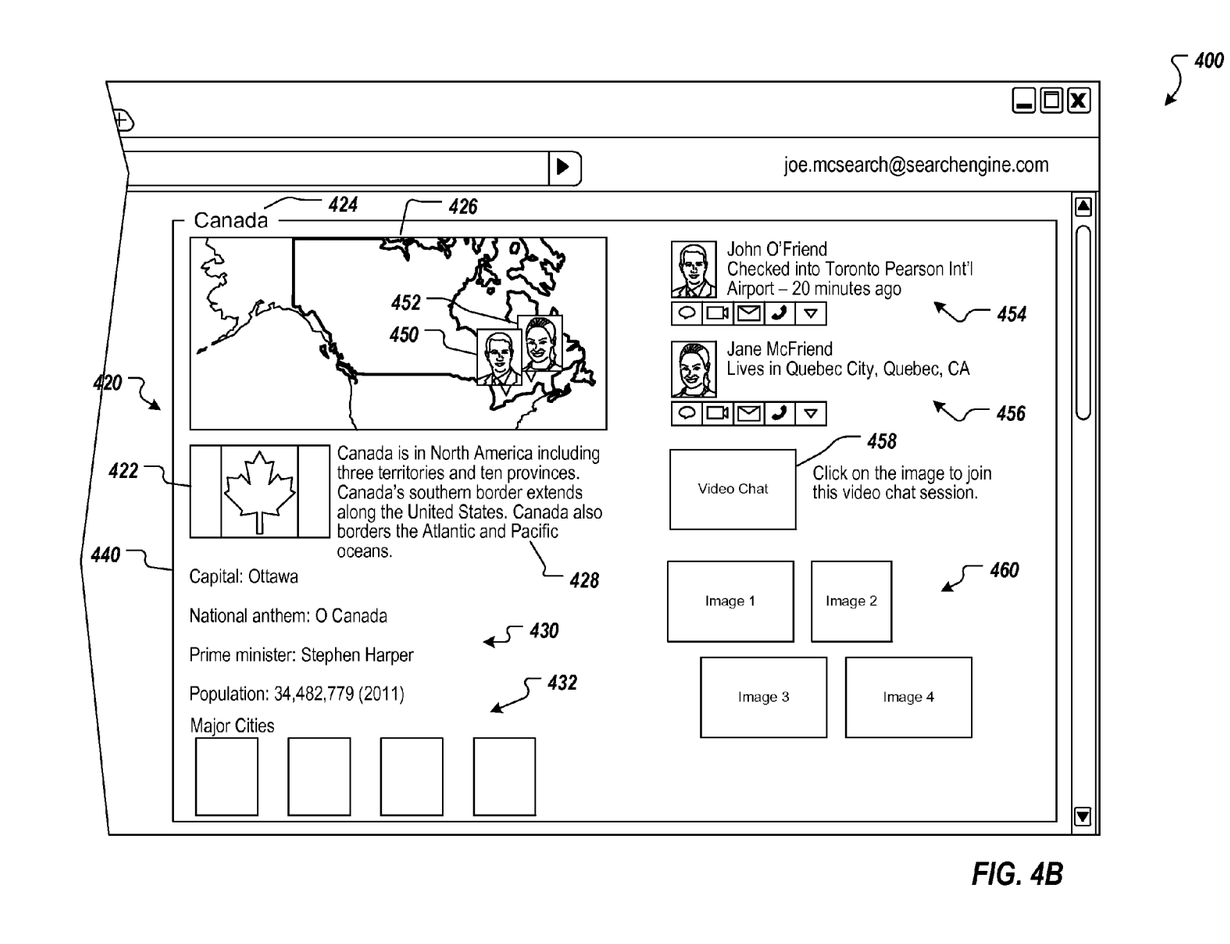

FIGS. 4A and 4B depict a screen shot of an example search interface 400 in which a knowledge panel 420 is presented with search results 411a-411d in a search results page 402. The search interface 400 can be presented at a user device 106 and includes a query entry field 405 in which a user can enter a search query 409. The search interface 400 also includes a query initiation element 407 with which the search query 409 can be submitted to the search system 120. For example, in response to user interaction with the search initiation element 407, the user device 106 can submit the search query 409 to the search system 120.

The search interface 400 also includes a knowledge panel 420 and search results 411a-411d. In this example search interface 400, the knowledge panel 420 and the search results 411a-411d have been provided in response to the search query "Canada." Although one knowledge panel 420 and four search results 411a-411d are illustrated in the search interface 400, other numbers of knowledge panels and/or other numbers of search results can be presented in a search interface.

In the depicted example, and based on the search query "Canada," the knowledge panel 420 relates to the country Canada. In some examples, the knowledge panel 420 can be generated using a "place" template. In some examples, the "place" template can specify types of content items with which the knowledge panel 420 is to be populated and can include placeholders for the types of content items. For example, the "place" template may include a placeholder for each of a title, an image depicting a map of the place, a description, a set of facts, one or more sets of images, and/or related search queries.

The knowledge panel 420 includes a title 424 and can include links (not shown) to resources having additional information about Canada. Example links can include a link to an official web site of Canada, national weather information for Canada, and news about Canada.

The example knowledge panel 420 includes an image 422 depicting the Canadian flag, an image 426 depicting a map of Canada, a description 428 of Canada, and a set of facts 430 about Canada. The example knowledge panel 420 also includes images 432. In some examples, images 432 can include images of cities, landmarks, sports, animals, and/or other appropriate subject matter that can be associated with Canada. In some examples, each of these types of images can be considered a different type of content item for purposes of populating a knowledge panel. In some examples, each image may include a link that, when selected, causes a new search to be initiated for the subject of the image. For example, if an image of a city is selected, the search interface 400 may cause the user device 106 displaying the search interface 400 to submit a search query to the search system 120 for the city depicted in the image.

As described above, a knowledge panel may be displayed in a knowledge panel area. In this example search interface 400, an area inside a perimeter 440 may be considered the knowledge panel area. As shown in FIGS. 4A and 4B, this knowledge panel area and the knowledge panel 420 consume a larger area than each individual search results 411a-411d. In some implementation, the knowledge panel area or the knowledge panel may be substantially the same size as a standard search result or smaller than a standard search result.

With continued reference to FIGS. 4A and 4B, and in accordance with implementations of the present disclosure, the search results page 402 is provided as an enhanced search results page and includes annotations 450, 452, 454, 456, 458, 460. In some examples, the annotations are specific to the user that submitted the query "Canada" and are specific to one or more topics associated with the query. In the depicted example, the user that submitted the query, e.g., the "searching user," can be logged into the search service, e.g., "joe.mcsearch@searchengine.com," and an identifier associated with the user can be determined based on log-in information, e.g., username and password.

In the depicted example, the annotations 450, 452 include thumbnail images that overlay the image 426, the annotations 454, 456 include contact summaries, the annotation 458 is a graphical representation of an ongoing video chat session, and the annotations 460 are each provided as images. For example, the annotations 450, 452, 454, 456 can each provide a graphical representation of a contact of the searching user within one or more computer-implemented services, e.g., a social networking service. In the depicted example, the annotations 450, 454 can be provided in response to determining that the contact "Jack O'Friend" recently checked into an airport located in Canada, Jack O'Friend is a contact of the searching user within one or more computer-implemented services, and the topic "Canada" is associated with both the searching user and the search query 409. In the depicted example, the annotations 452, 456 can be provided in response to determining that the contact "Jane McFriend" lives in Canada, Jane McFriend is a contact of the searching user within one or more computer-implemented services, and the topic "Canada" is associated with both the searching user and the search query 409.

In some examples, the annotation 458 can provide a link that, if acted on by the searching user, e.g., clicked on, can result in the searching user joining an on-going video chat session. In some examples, the annotation 458 can be provided in response to determining that the video chat session is associated with the topic "Canada," and the topic "Canada" is associated with both the searching user and the search query 409. In some examples, the video chat session can be determined to be associated with the topic "Canada," if, for example, a participant in the video conference is determined to be associated with the topic Canada, e.g., the participant lives in Canada, the participant is Canadian, the participant is participating in the video chat session from Canada.

In some examples, the annotations 460 can be provided in response to determining that the underlying images are associated with the topic "Canada" and with the searching user, and that the topic "Canada" is associated with both the searching user and the search query 409. In some examples, an image can be determined to be associated with the searching user, if, for example, the image is available for viewing by the searching user, e.g., is an image that was posted by the searching user, is an image that was posted by a contact of the searching user and made available for view to the searching user. In some examples, an image can be determined to be associated with the topic "Canada," if, for example, the image includes geo-location meta-data indicating that the image was taken in Canada, the image was posted by a contact of the searching user that is lives in Canada, and/or the image depicts a landmark that is located in Canada.

It is appreciated that the annotations 450, 452, 454, 456, 458, 460 are merely examples, and that any appropriate annotations can be provided. For example, annotations can also include links to one or more resources, e.g., web pages, videos, documents, images, embedded resources, e.g., an embedded video, and the like.

Accordingly, each annotation 450, 452, 454, 456, 458, 460 can be provided as data that is specific to the searching user, that is relevant to the search results 411a, 411b, 411c, 411d and/or the knowledge panel 420, but that is not explicit to a particular search result and/or the knowledge panel. More particularly, the example search results page 402 includes social annotations 470, 472, 474 that are respectively explicit to search results 411a, 411b, 411c. For example, the social annotation 470 indicates that three contacts of the searching user have endorsed the web site underlying the search result 411a, the social annotation 411b indicates that the searching user had already visited the web site underlying the search result 411b, and that a contact, e.g., "Joe Smith" of the user had visited the web site underlying the search result 411c. Consequently, the social annotations 470, 472, 474 are representative of explicit actions performed by the searching user and/or contacts of the searching user with respect to web sites underlying the search results 411a, 411b, 411c, respectively, and have therefore been provided within the search results page 402. The annotations 450, 452, 454, 456, 458, 460 have been determined to be implicitly relevant to the search results and/or the knowledge panel based on topic and association with the searching user, and have therefore been provided to enhance the search results page 402.

Figure 5:
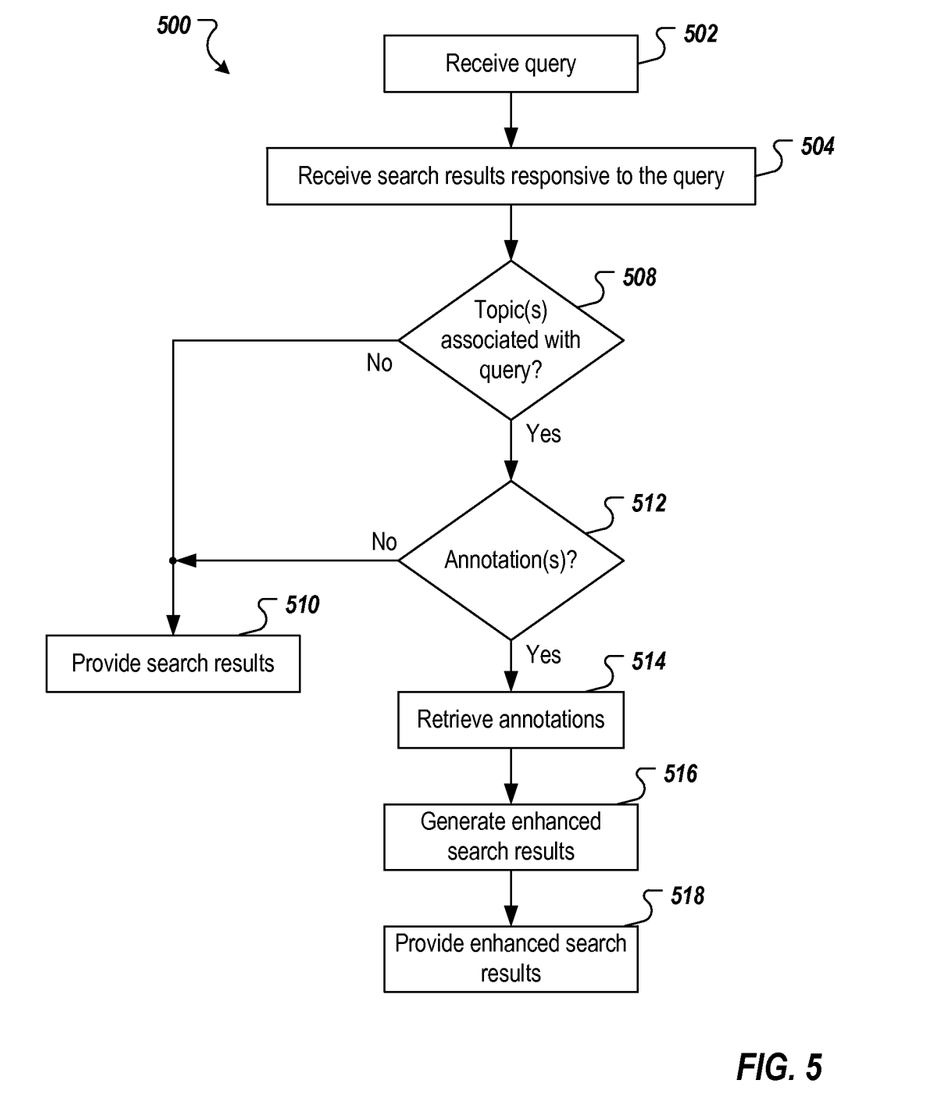
FIG. 5 is a flowchart of an example process that can be executed in accordance with implementations of the present disclosure.

FIG. 5 is a flow chart of an example process 500 that can be executed in accordance with implementations of the present disclosure. The example process 500 can be implemented, for example, by the search system 120 in conjunction with the knowledge panel apparatus 130 and the annotation system. In some examples, the example process 500 can be provided by one or more computer-executable programs executed using one or more computing devices. In some implementations, the example process 500 is performed to determine whether enhanced search results are to be provided and, if so, to provide enhanced search results.

A query is received (502). For example, and with reference to FIG. 1, a search query 109 can be received by the search system 120 from a user device 106. Search results responsive to the query are received (504). For example, the search system 120 can receive search results from the search index 122, the search results being responsive to the query. It is determined whether one or more topics are associated with the query (508). For example, and with reference to FIG. 2, the mapping module 214 can determine whether one or more topics are associated with the query. In some examples, the query includes one or more terms, and a term can be associated with one or more topics. In some examples, an index of terms and topics can be provided and can be referenced to determine whether one or more topics are associated with the query. In some examples, if it is determined that no topics are associated with the query, the search results are provided for display (510). For example, the search system 120 can provided a search results page to the user device 106 that sent the query, the search results page being absent of annotations discussed herein.

In some examples, if it is determined that one or more topics are associated with the query, it is determined whether one or more annotation(s) are to be provided (512). For example, the mapping module 214 can determine whether one or more annotations are to be provided. In some examples, one or more topics associated with the user that submitted the query can be compared to the one or more topics associated with the query. In some examples, if there is an intersection between the one or more topics associated with the user that submitted the query and the one or more topics associated with the query, it can be determined that annotations are to be provided for topics included in the intersection. In some example, it can be determined whether a knowledge panel is to be displayed with the search results, and annotations can be provided if a knowledge panel is to be displayed, and there is an intersection between the one or more topics associated with the user that submitted the query and the one or more topics associated with the query. If it is determined that no annotations are to be provided, the search results are provided for display (510).

If it is determined that annotations are to be provided, annotations are retrieved (514). For example, the mapping module 214 can retrieve annotations from the annotations repository 228. Enhanced search results are generated (516). For example, the mapping module 214 can generate an enhanced search results page. In some examples, annotations can be mapped to a knowledge panel and/or search results that are to be provided in the enhanced search results page. The enhanced search results are provided for display (518). For example, the search system 120 can provided the enhanced search results page to the user device 106 that sent the query, the enhanced search results page including annotations discussed herein.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   obtaining, by the data processing apparatus, search results that are responsive to a received query received from a user;
   retrieving a set of topics associated with the user from a topics repository, the set of topics being provided from a topics service that associates one or more topics with users of one or more computer-implemented services, and each topic in the set of topics being associated with a topic score;
   determining a subset of topics from the set of topics associated with the user, the subset of topics comprising topics having respective topic scores that exceed a threshold score;
   determining, by the data processing apparatus, that one or more topics are associated with the query, and in response:
      determining, by the data processing apparatus, that social annotations are to be displayed in a search results page based on: one or more topics being included in an intersection of i) the one or more topics associated with the query and ii) one or more topics in the subset of topics associated with the user having topic scores that exceed the threshold score, and in response to determining that social annotations are to be displayed:
      providing an electronic document comprising instructions that, when executed by a computing device, cause the computing device to display an enhanced search results page, wherein the enhanced search results page comprises the obtained search results and one or more social annotations, at least one social annotation comprising a graphical representation of social networking data that is associated with a respective search result and the user; and
      transmitting, by the data processing apparatus, the electronic document to a computing device associated with the user.

2. The method of claim 1, wherein determining that social annotations are to be displayed comprises determining that the at least one topic is associated with the user.

3. The method of claim 2, wherein determining that the at least one topic is associated with the user comprises:
   identifying a set of topics associated with the user based on the data associated with the user; and
   determining that the at least one topic is included in the set of topics associated with the user.

4. The method of claim 3, wherein the data associated with the user comprises an identifier assigned to the user.

5. The method of claim 1, wherein determining that social annotations are to be displayed in the search results page comprises determining that a knowledge panel is to be displayed in the search results page, the knowledge panel being associated with the at least one topic, the knowledge panel being annotated with the at least one social annotation in the enhanced search results page.

6. The method of claim 5, wherein determining that a knowledge panel is to be displayed comprises identifying content for display in the knowledge panel for a factual entity associated with the knowledge panel, the knowledge panel presenting the identified content in a knowledge panel area alongside at least a portion of the search results.

7. The method of claim 1, wherein at least one social annotation comprises at least one of an image, a link to a resource, text, a video, and digital content distributed using one or more computer-implemented services.

8. The method of claim 1, further comprising retrieving, from a data store, social annotations of the one or more social annotations in response to determining that social annotations are to be displayed in a search results page.

9. The method of claim 1, further comprising generating social annotations of the one or more social annotations in response to determining that social annotations are to be displayed in a search results page.

10. A system comprising:
    a data store for storing data; and
    one or more processors configured to interact with the data store, the one or more processors being further configured to perform operations comprising:
       obtaining search results that are responsive to a received query received from a user;
       retrieving a set of topics associated with the user from a topics repository, the set of topics being provided from a topics service that associates one or more topics with users of one or more computer-implemented services, and each topic in the set of topics being associated with a topic score;
       determining a subset of topics from the set of topics associated with the user, the subset of topics comprising topics having respective topic scores that exceed a threshold score;
       determining that one or more topics are associated with the query, and in response:
          determining that social annotations are to be displayed in a search results page based on one or more topics being included in i) an intersection of the one or more topics associated with the query and ii) one or more topics in the subset of topics associated with the user having topic scores that exceed the threshold score, and in response to determining that social annotations are to be displayed:
          providing an electronic document comprising instructions that, when executed by a computing device, cause the computing device to display an enhanced search results page, wherein the enhanced search results page comprises the obtained search results and one or more social annotations, at least one social annotation comprising a graphical representation of social networking data that is associated with a respective search result and the user; and transmitting the electronic document to a computing device associated with the user.

11. The system of claim 10, wherein determining that social annotations are to be displayed comprises determining that the at least one topic is associated with the user.

12. The system of claim 11, wherein determining that the at least one topic is associated with the user comprises:
identifying a set of topics associated with the user based on the data associated with the user; and
determining that the at least one topic is included in the set of topics associated with the user.

13. The system of claim 12, wherein the data associated with the user comprises an identifier assigned to the user.

14. The system of claim 10, wherein determining that social annotations are to be displayed in the search results page comprises determining that a knowledge panel is to be displayed in the search results page, the knowledge panel being associated with the at least one topic, the knowledge panel being annotated with the at least one social annotation in the enhanced search results page.

15. The system of claim 14, wherein determining that a knowledge panel is to be displayed comprises identifying content for display in the knowledge panel for a factual entity associated with the knowledge panel, the knowledge panel presenting the identified content in a knowledge panel area alongside at least a portion of the search results.

16. The system of claim 10, wherein at least one social annotation comprises at least one of an image, a link to a resource, text, a video, and digital content distributed using one or more computer-implemented services.

17. The system of claim 10, further comprising retrieving, from a data store, social annotations of the one or more social annotations in response to determining that social annotations are to be displayed in a search results page.

18. The system of claim 10, wherein operations further comprise generating social annotations of the one or more social annotations in response to determining that social annotations are to be displayed in a search results page.

19. A non-transitory computer readable storage device storing instructions that, when executed by one or more processors, cause the one or more processors to perform operations comprising:
obtaining search results that are responsive to a received query received from a user;
retrieving a set of topics associated with the user from a topics repository, the set of topics being provided from a topics service that associates one or more topics with users of one or more computer-implemented services, and each topic in the set of topics being associated with a topic score;
determining a subset of topics from the set of topics associated with the user, the subset of topics comprising topics having respective topic scores that exceed a threshold score;
determining that one or more topics are associated with the query, and in response:
determining that social annotations are to be displayed in a search results page based on one or more topics being included in an intersection of i) the one or more topics associated with the query and ii) one or more topics in the subset of topics associated with the user having topic scores that exceed the threshold score, and in response to determining that social annotations are to be displayed:
providing an electronic document comprising instructions that, when executed by a computing device, cause the computing device to display an enhanced search results page, wherein the enhanced search results page comprises the obtained search results and one or more social annotations, at least one social annotation comprising a graphical representation of social networking data that is associated with a respective search result and the user; and
transmitting the electronic document to a computing device associated with the user.

20. The non-transitory computer readable storage device of claim 19, wherein determining that social annotations are to be displayed comprises determining that the at least one topic is associated with the user.

21. The non-transitory computer readable storage device of claim 20, wherein determining that the at least one topic is associated with the user comprises:
identifying a set of topics associated with the user based on the data associated with the user; and
determining that the at least one topic is included in the set of topics associated with the user.

22. The non-transitory computer readable storage device of claim 21, wherein the data associated with the user comprises an identifier assigned to the user.

23. The non-transitory computer readable storage device of claim 19, wherein determining that social annotations are to be displayed in the search results page comprises determining that a knowledge panel is to be displayed in the search results page, the knowledge panel being associated with the at least one topic, the knowledge panel being annotated with the at least one social annotation in the enhanced search results page.

24. The non-transitory computer readable storage device of claim 23, wherein determining that a knowledge panel is to be displayed comprises identifying content for display in the knowledge panel for a factual entity associated with the knowledge panel, the knowledge panel presenting the identified content in a knowledge panel area alongside at least a portion of the search results.

25. The non-transitory computer readable storage device of claim 19, wherein at least one social annotation comprises at least one of an image, a link to a resource, text, a video, and digital content distributed using one or more computer-implemented services.

26. The non-transitory computer readable storage device of claim 19, further comprising retrieving, from a data store, social annotations of the one or more social annotations in response to determining that social annotations are to be displayed in a search results page.

27. The non-transitory computer readable storage device of claim 19, wherein operations further comprise generating social annotations of the one or more social annotations in response to determining that social annotations are to be displayed in a search results page.

* * * * *

UNITED STATES PATENT AND TRADEMARK OFFICE
CERTIFICATE OF CORRECTION

PATENT NO. : 9,934,283 B2  
APPLICATION NO. : 13/791020  
DATED : April 3, 2018  
INVENTOR(S) : Fredinburg et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this  
Fourth Day of September, 2018

Andrei Iancu  
*Director of the United States Patent and Trademark Office*